United States Patent
Okamoto et al.

(10) Patent No.: US 6,736,456 B2
(45) Date of Patent: May 18, 2004

(54) SEAT APPARATUS FOR AUTOMOBILE

(75) Inventors: Kazuki Okamoto, Tokyo (JP); Masataka Tobita, Yokohama (JP)

(73) Assignee: NHK Spring Co., Ltd., Kanagawa (JP)

(*) Notice: Subject to any disclaimer, the term of this patent is extended or adjusted under 35 U.S.C. 154(b) by 0 days.

(21) Appl. No.: 10/327,664

(22) Filed: Dec. 24, 2002

(65) Prior Publication Data

US 2003/0132654 A1 Jul. 17, 2003

(30) Foreign Application Priority Data

Dec. 26, 2001 (JP) .......... 2001-394099

(51) Int. Cl.[7] ............... B60N 2/20
(52) U.S. Cl. ............ 297/336; 297/254
(58) Field of Search ............ 297/331, 335, 297/336, 254, 334

(56) References Cited

U.S. PATENT DOCUMENTS

| | | | | |
|---|---|---|---|---|
| 4,512,609 A | * | 4/1985 | Parsson | 297/331 |
| 5,558,386 A | * | 9/1996 | Tilly et al. | 297/336 |
| 5,795,023 A | * | 8/1998 | Kayumi | 297/331 |
| 6,070,939 A | * | 6/2000 | Matsuo et al. | 297/336 X |
| 6,155,639 A | * | 12/2000 | Frolo | 297/331 |

* cited by examiner

Primary Examiner—Anthony D Barfield
(74) Attorney, Agent, or Firm—Arent Fox Kintner Plotkin & Kahn, PLLC

(57) ABSTRACT

A seat apparatus comprises a backrest portion which can be tilted, a hook mounted on the upper portion which is a tilting end, a sitting portion which can raise on a fulcrum, which is a front edge, and an engaged portion which can engage a book mounted on a rear. When the sitting portion is raised, the rear of the sitting portion is turned toward the backrest portion side. When the backrest portion is tilted forward, the hook is engaged with the engaged portion, the backrest portion and the sitting portion are fixed to each other, and then it is in a double folded state. The hook is arranged at a position where a tether strap for mounting an auxiliary seat on the backrest portion is hung. The hook is integrally formed with a guide of the tether strap.

8 Claims, 4 Drawing Sheets

SEAT APPARATUS FOR AUTOMOBILE

BACKGROUND OF THE INVENTION

Field of the Invention

The present invention relates to a foldable seat apparatus for an automobile, on which an auxiliary seat, such as a child seat, may be mounted.

For example, in car types such as a station wagon or a hatchback, there are many cars that can convert rear space into a cargo area and can expand the cargo area by folding down the rear seat. Various folding patterns of rear seat are provided. The double folding type that pushes a backrest portion down forward after raising a sitting portion forward is typical. In this case the back of the backrest portion becomes a flat carrier. Furthermore, among cars, there are some car models which maintain a double folding state, by engaging the hook fixed on an upper portion of the backrest portion with an engagement portion fixed on the back of the sitting portion.

In recent years, when picking up infants by car, it is required to sit infants down in a child seat which is mounted on a car seat. To mount the child seat on the rear seat, for example, a system is proposed which fixes a lower portion of the child seat to a bracket called a lower anchor provided on a body floor, and fixes an upper portion by hanging a tether strap with the backrest portion. The tether strap is fixed on the rear of the backrest portion of the child seat, and is fixed on the back of the backrest portion by hanging to an upper portion of the backrest portion of the rear seat.

However, the tether strap easily slips off sideways because sliding occurs. Therefore, it was difficult to mount the child seat due to this slip. In addition, when an infant sits down in the child seat, the backrest portion is deformed as the tether strap bites into the top portion of the backrest portion. As a result, there are cases in which a user is dissatisfied. A guide for preventing the side slip of the tether strap and a hard protection pad for preventing biting are provided to the backrest portion for solving these inconveniences. However, by the conventional technique, the cost is increased due to the increase in the number of parts and the number of the assembly processes.

SUMMARY OF THE INVENTION

Accordingly, an object of the present invention is to provide a seat apparatus for an automobile which can mount a child seat easily to prevent the side slip of the tether strap and biting into the backrest portion, while suppressing increase in cost.

In order to achieve the object mentioned above, in accordance with the present invention, a seat apparatus for an automobile comprising: a backrest portion which can be tilted; a hook mounted on an upper portion, which is a tilting end, of said backrest portion; a sitting portion which can be raised on a fulcrum, which is a front edge; an engaged portion which can engage a hook mounted on a rear of said sitting portion, in which when said sitting portion is raised and the rear of said sitting portion is turned toward the backrest portion side, and subsequently, said backrest portion is tilted forward, said hook is engaged with said engaged portion, said backrest portion and said sitting portion are fixed to each other, setting the double folding state; wherein said hook is arranged at a position where a tether strap for mounting an auxiliary seat on said backrest portion is hung, and said hook is integrally formed with a guide of said tether strap.

In accordance with the present invention, to provide the upper part of a child seat on a seat apparatus for an automobile, a tether strap of a child seat is hung on a hook of a backrest portion and is extended to the rear of a backrest portion using a guide, and a fixed end of the guide is fixed to a predetermined place. The tether strap can be fixed in a straight state without slipping off to the side by the guide. Moreover, since the backrest portion is protected with the hook, the biting of the tether strap is prevented. In addition, it is possible to reliably position the child seat for the backrest portion since side slipping of the tether strap is prevented by the guide. Therefore, it is possible to easily mount the child seat on the seat. Furthermore, it is possible to suppress increase in cost, and to prevent increasing the number of parts and the number of assembly processes, since the guide is integrally mounted with the hook.

In accordance with a preferable aspect of the present invention, the guide comprises sidewall portions formed on both edges of the hook, and projections which project and bend inward from upper edges of the sidewall portions. It is possible to surely position the child seat for the backrest portion since side slipping of the tether strap is prevented by sidewall portions and projections of the guide. Therefore, it is possible to easily mount the child seat on the seat.

DESCRIPTION OF THE PREFERRED EMBODIMENTS

A description will be given of an embodiment in accordance with the present invention.

Figure 1:
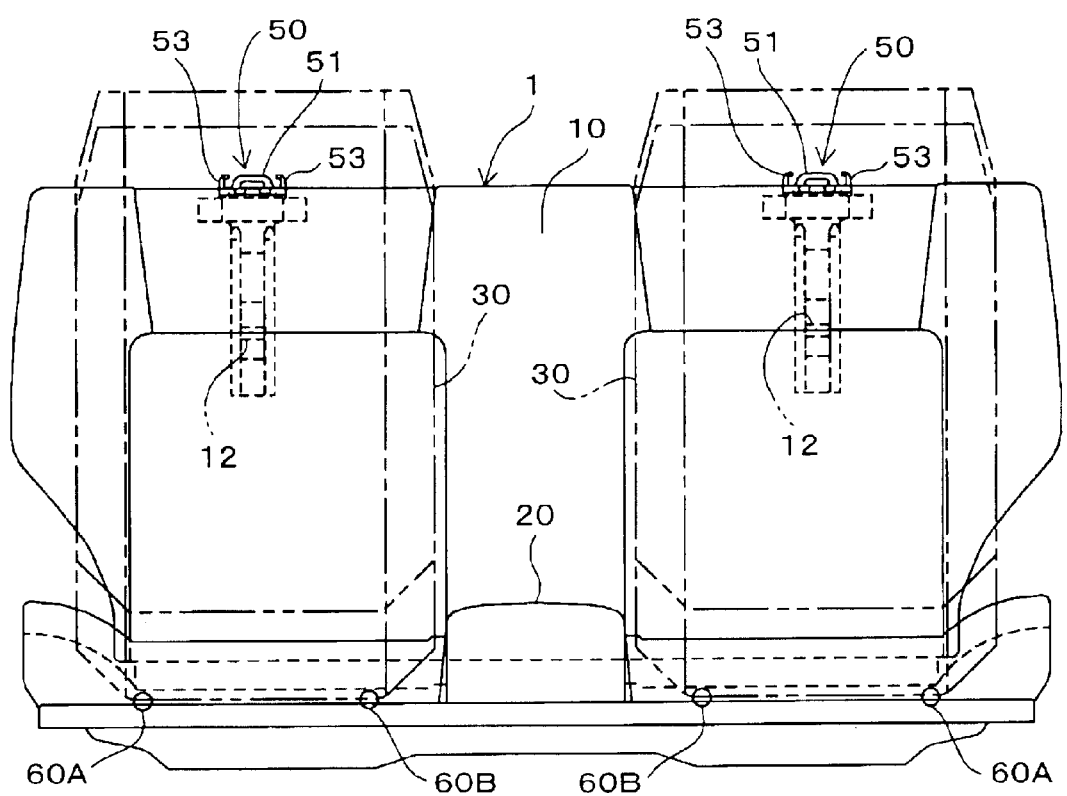
FIG. 1 is a front view of a seat apparatus in accordance with the embodiment of the present invention.
Figure 2:
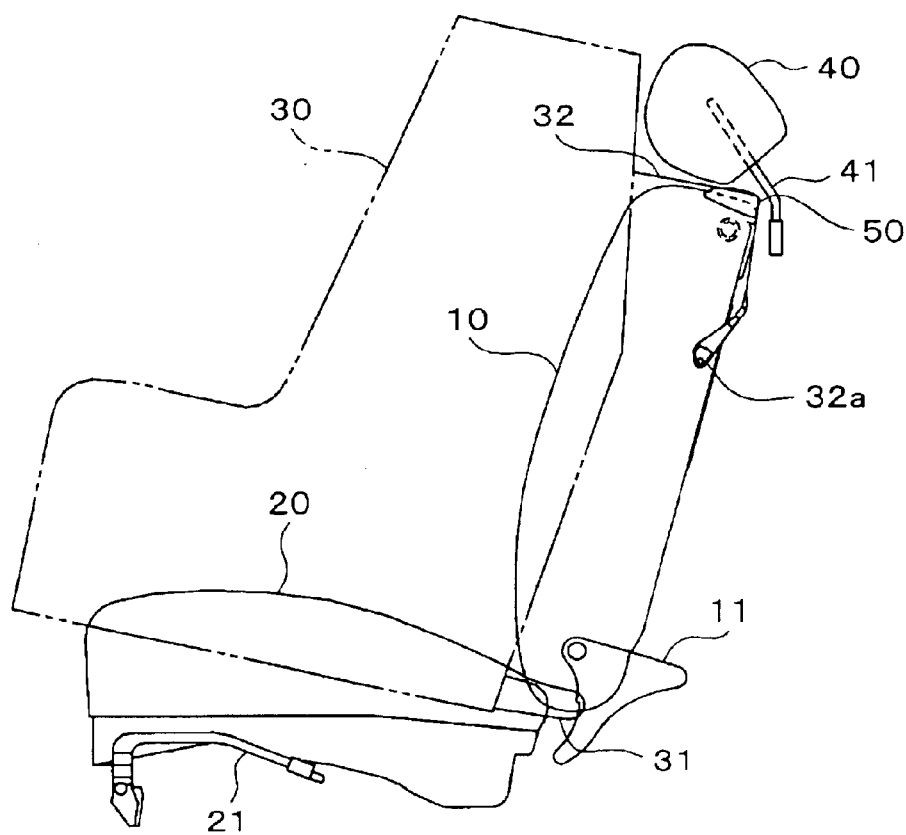
FIG. 2 is a side view of a seat apparatus in accordance with the embodiment.

FIG. 1 is a front view of a seat apparatus in accordance with the embodiment, and FIG. 2 is a side view of the seat apparatus. The rear seat 1 is a two seating configuration, and the shape to stabilize the sitting posture of a passenger consists of backrest portion 10 and sitting portion 20 which are made in a state of one pair of right and left. Both the backrest portion and the sitting portion are cushion materials such as urethane form which are covered with upholstery and are supported with a steel frame. In FIG. 1 and FIG. 2, reference number 30 is a child seat (an auxiliary seat) mounted on rear seat 1.

Figure 3:
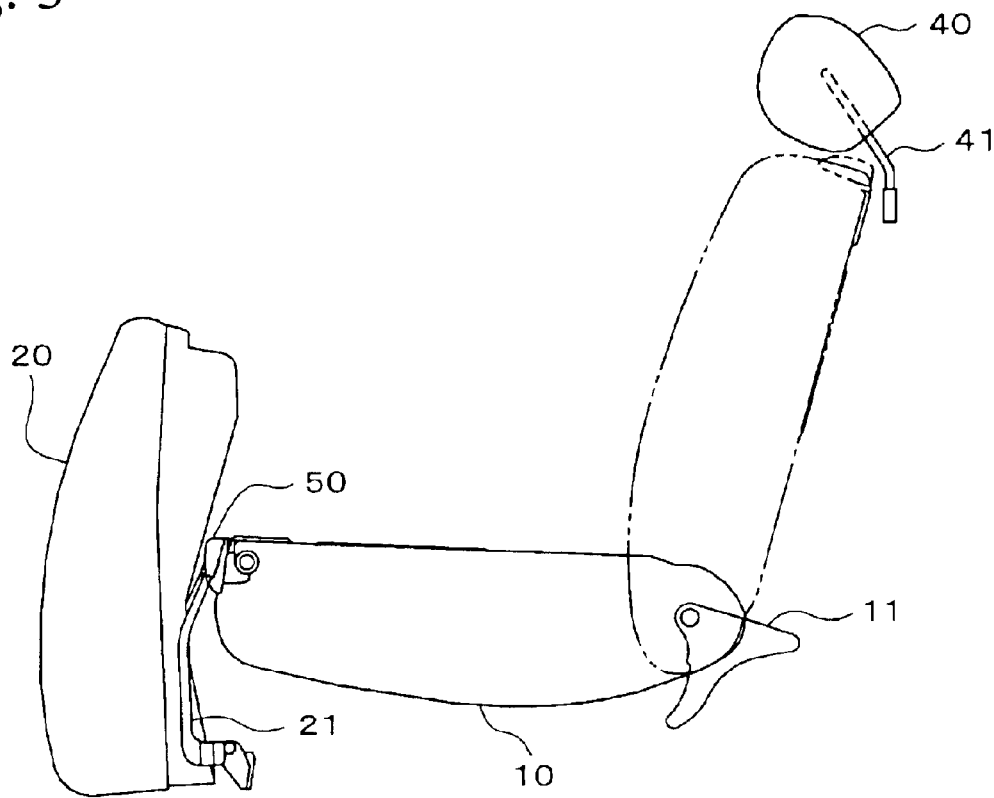
FIG. 3 is a side view showing a double folding state of a seat apparatus in accordance with the embodiment.

As shown in FIG. 2, backrest portion 10 is mounted through hinge bracket 11 fixed on the body floor, and is tilted freely in forward and backward directions. Backrest portion 10 is usually supported in a state such that it is tilted slightly to rearward by the body (not shown). Headrest 40 is arranged in the upper part of backrest portion 10. This headrest 40 is mounted on the backward body, which is not shown, of rear seat 1 through stay 41. Sitting portion 20 is mounted on the body floor, and can be raised up on a fulcrum of the lower portion of the front edge thereof. As shown in FIG. 3, rear seat 1 will be in a double folding state by tilting forward and pushing down backrest portion 10, after raising sitting portion 20. In this state, the back of backrest portion 10 becomes a flat carrier.

Figure 4:
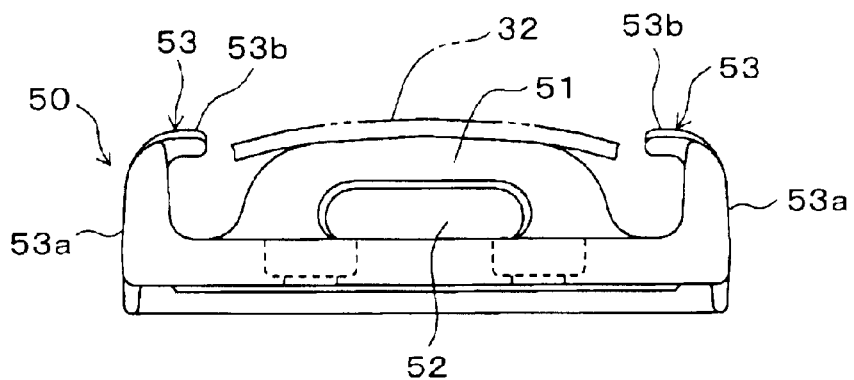
FIG. 4 is a front view of a hook plate comprising a hook and a guide in accordance with the embodiment.
Figure 5:
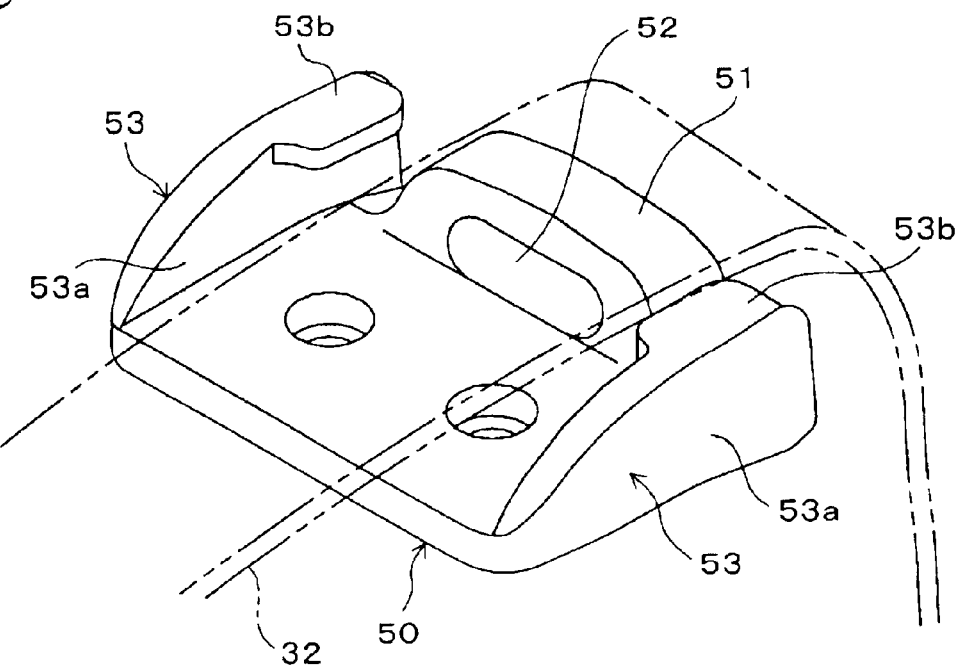
FIG. 5 is a squint view of a hook plate comprising a hook and a guide in accordance with the embodiment.

As shown in FIG. 1, hook plate 50 made from rigid resin is fixed on a central part corresponding to a sitting position of right and left and upper edge of backrest portion 10. As shown in FIG. 4 and FIG. 5, hook 51, which is arch-shaped and extends from side to side, is formed on the central rear of hook plate 50. Furthermore, hook hole 52 which is oval-shaped, is formed in hook 51. Guides 53 and 53 of one pair of right and left are formed on both ends of hook plate 50 across hook 51. Guide 53 consists of sidewall portion 53a and projection 53b which projects and bends inward from the upper edge of sidewall portion 53a. Tether strap 32 mentioned later is hung on hook 51 to mount child seat 30 on backrest portion 10. Guide 53 prevents the slip of tether strap 32 hung on hook 51. Therefore, a measurement of guide 53 is the measurement that can realize the function, and, moreover, it is set in the measurement that does not interfere with the rear of sitting portion 20 in double folding.

Figure 6:
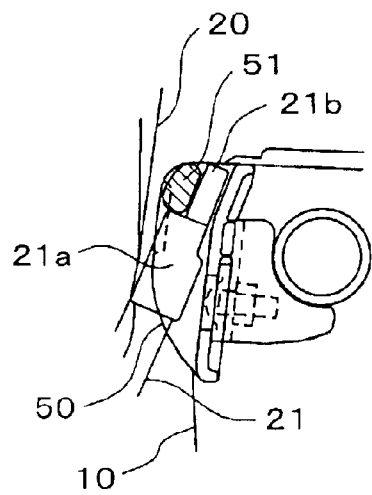
FIG. 6 is a side view showing a maintenance mechanism of a double folding state.

As shown in FIG. 2, rod (engaged portion) 21 extended backward is fixed to the rear of sitting portion 20. Rod 21 is arranged in a state of one pair of right and left against sitting portion 20. Brim portion 21a is formed on the tip of the rod 21 as shown in FIG. 6. Small projection 21b is formed on the tip of brim portion 21a. In the above double folding state, since small projection 21b of rod 21 is engaged with hook hole 52, hook 51 is engaged to rod 21. That is to say, rod 21 turns upward when sitting portion 20 is raised, then hook hole 52 is engaged to small projection 21b of the tip of rod 21, and hook 51 is deposited on brim portion 21a, as shown in FIG. 6, when backrest portion 10 is pushed down forward. Hereby, backrest portion 10 and sitting portion 20 are fixed to each other, and a double folding state is held.

As shown in FIG. 1, lower anchors 60A and 60B for fixing the lower part of child seat 30 are arranged in each right and left pair against a sitting position of right and left underneath of rear seat 1. Outside lower anchor 60A is arranged to a frame of sitting portion 20, and inside lower anchor 60B is arranged on the body floor. As shown in FIG. 2, fixing stay 31 of pair of right and left which is inserted between backrest portion 10 and sitting portion 20 by extending backward is arranged the lower part of child seat 30. Stay 31 is fixed in each lower anchor 60A and 60B.

Figure 7:
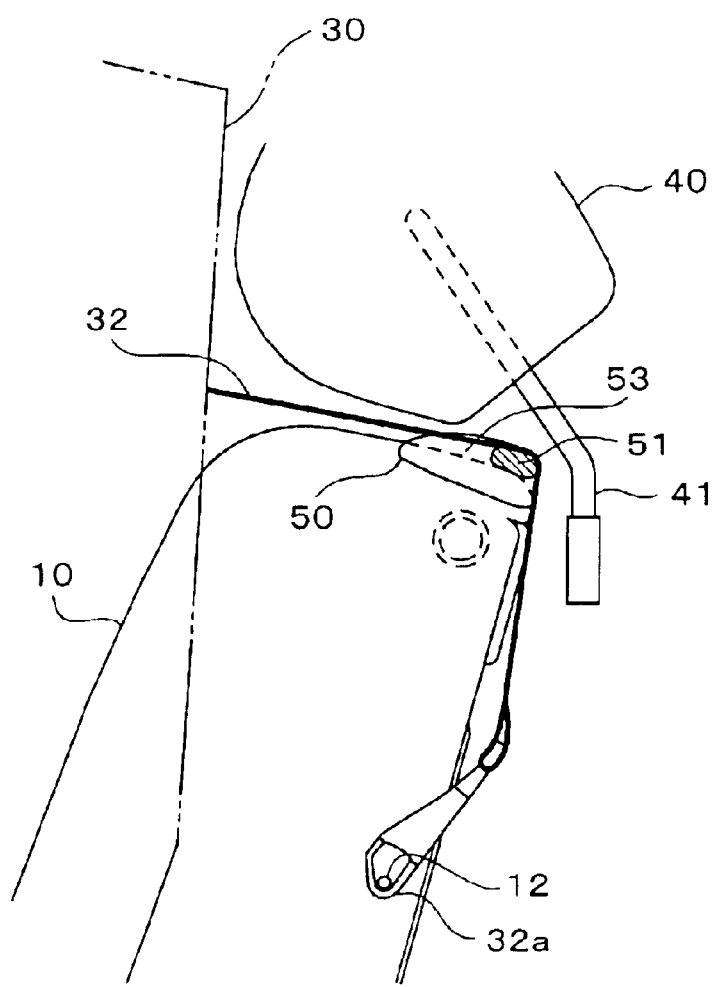
FIG. 7 is a side view showing a structure of a child seat fixed by a tether strap.

As shown in FIG. 7, one end of belt-shaped tether strap 32 is fixed on the upper back of child seat 30. This tether strap 32 extends backward from the center of a width direction of child seat 30, and fixing clip 32a is mounted on another end of tether strap 32. When child seat 30 is fixed on rear seat 1, tether strap 32 is hung at an upper end of backrest portion 10, and clip 32a is hung in tether anchor 12 mounted on the back of backrest portion 10. It is possible to adjust the length of tether strap 32, and the length is adjusted to obtain appropriate tension.

To mount tether strap 32 as mentioned above, tether strap 32 is hung from hook 51 of backrest portion 10, and is extended to the rear of backrest portion 10 by using guide 53; then, clip 32a is hanged and fixed to tether anchor 12. Therefore, the slip of tether strap 32 sideways restrained by sidewall portion 53a of guide 53, and it is possible to fix tether strap 32 in a straight state. In addition, since the sideslip of tether strap 32 is restrained by guide 53, it is possible to surely position child seat 30 against backrest portion 10. Therefore, it is possible to easily fix child seat 30. In addition, since backrest portion 10 is protected by hook 51, it is possible to prevent tether strap 32 from biting into the upper end of backrest portion 10. Furthermore, since guide 53 is integrally formed with hook 51, and is formed on hook plate 50 which is one body part, when guide 53 is formed, it is possible to prevent increase in the number of parts and the number of assembly processes. Thus, it is possible to prevent increase in cost.

What is claimed is:

1. A seat apparatus for an automobile comprising:
   a tiltable backrest portion;
   a hook mounted on an upper portion of said backrest portion, wherein said upper portion of said backrest portion is a tilting end;
   a sitting portion raisable about a fulcrum disposed at a front edge of said sitting portion; and
   an engaged portion mounted on a rear of said sitting portion,
   wherein the rear of said sitting portion faces said backrest portion when said sitting portion is raised about said fulcrum,
   wherein when said backrest portion is subsequently tilted forward toward said raised sitting portion, said engaged portion engages said hook to fix said backrest portion and said sitting portion to each other, and
   wherein said hook is mounted on said upper portion of said backrest portion at a position where a tether strap for mounting an auxiliary seat on said backrest portion is hung, and wherein said hook is integrally formed with a guide for said tether strap.

2. The seat apparatus according to claim 1, wherein said guide comprises:
   sidewall portions formed on both edges of said hook; and
   projections which project and bend inward from upper edges of said sidewall portions.

3. The seat apparatus according to claim 1, wherein the engaged portion is a rod.

4. The seat apparatus according to claim 1, wherein said hook has a hook hole, and said engaged portion engages said hook by passing through said hook hole to fix said backrest portion and said sitting portion to each other.

5. The seat apparatus according to claim 4, wherein the hook is arch-shaped and the hook hole is oval shaped.

6. The seat according to claim 4, wherein the engaged portion includes a brim portion formed at one end of the engaged portion and a projection extends from an end of the brim portion, and wherein the projection engages the hook hole.

7. The seat according to claim 4, wherein said engaged portion is a rod and said rod is vertically arranged when said sitting portion is raised, and wherein the rod is inserted into said hook hole when said backrest portion has an anchor with which said hook is engaged.

8. The seat according to claim 1, wherein said tether strap has a hook at an end thereof, and said backrest portion has an anchor with which said hook is engaged.

* * * * *